United States Patent
Yosui

(10) Patent No.: US 9,991,583 B2
(45) Date of Patent: *Jun. 5, 2018

(54) ANTENNA APPARATUS AND COMMUNICATION TERMINAL INSTRUMENT

(71) Applicant: Murata Manufacturing Co., Ltd., Nagaokakyo-shi, Kyoto-fu (JP)

(72) Inventor: Kuniaki Yosui, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/376,787

(22) Filed: Dec. 13, 2016

(65) Prior Publication Data
US 2017/0093017 A1    Mar. 30, 2017

Related U.S. Application Data

(63) Continuation of application No. 13/706,409, filed on Dec. 6, 2012, now Pat. No. 9,558,384, which is a (Continued)

(30) Foreign Application Priority Data
Jul. 28, 2010    (JP) ................... 2010-169827

(51) Int. Cl.
H01Q 1/22    (2006.01)
H01Q 7/00    (2006.01)
H01Q 1/36    (2006.01)

(52) U.S. Cl.
CPC ......... *H01Q 1/2283* (2013.01); *H01Q 1/2291* (2013.01); *H01Q 1/36* (2013.01); *H01Q 7/00* (2013.01)

(58) Field of Classification Search
None
See application file for complete search history.

(56) References Cited

U.S. PATENT DOCUMENTS 6,034,651 A * 3/2000 Enguent ............ G06K 7/10336
                                                    340/572.7
6,194,993 B1 * 2/2001 Hayashi ............... G06K 7/0008
                                                     235/435

(Continued)

FOREIGN PATENT DOCUMENTS

JP    2008 197714    * 8/2008

OTHER PUBLICATIONS

Yosui, "Antenna Apparatus and Communication Terminal Instrument", U.S. Appl. No. 13/706,409, filed Dec. 6, 2012.

*Primary Examiner* — Trinh Dinh
(74) *Attorney, Agent, or Firm* — Keating & Bennett, LLP

(57) ABSTRACT

In an antenna apparatus, a first current is induced in a first booster conductor by a current flowing through a coil conductor of a power feed antenna, and the first current circulates along a circumference of the first booster conductor. A second current is induced in a second booster conductor by the current flowing through the coil conductor of the power feed antenna, and the second current circulates along a circumference of the second booster conductor. A third current is induced in the first booster conductor by the second current flowing through the second booster conductor, and the third current circulates along the circumference of the first booster conductor. Thus, the antenna apparatus is much less influenced by nearby metallic objects and a shape of an included radiation plate may be more freely determined without requiring a highly accurate positional relationship between the radiation plate and the coil conductor.

10 Claims, 12 Drawing Sheets

Related U.S. Application Data continuation of application No. PCT/JP2011/067127, filed on Jul. 27, 2011.

(56) References Cited

U.S. PATENT DOCUMENTS

| | | | |
|---|---|---|---|
| 9,558,384 B2 * | 1/2017 | Yosui | H01Q 1/243 |
| 9,812,766 B2 * | 11/2017 | Kato | H01Q 1/243 |
| 2002/0118143 A1 * | 8/2002 | Yokoshima | H01Q 1/22 343/895 |
| 2006/0055609 A1 * | 3/2006 | Harano | H01Q 1/243 343/702 |
| 2010/0060538 A1 * | 3/2010 | Suetsuna | H01F 1/33 343/787 |
| 2011/0063184 A1 * | 3/2011 | Furumura | G06K 19/07749 343/856 |
| 2011/0227799 A1 * | 9/2011 | Hashimoto | H01Q 1/2225 343/702 |
| 2012/0001701 A1 * | 1/2012 | Taniguchi | G06K 7/0008 333/5 |
| 2012/0091821 A1 * | 4/2012 | Kato | H01Q 1/38 307/104 |
| 2012/0112971 A1 * | 5/2012 | Takeyama | H01Q 1/243 343/702 |
| 2012/0262357 A1 * | 10/2012 | Kato | H01Q 1/38 343/788 |
| 2013/0099994 A1 * | 4/2013 | Yosui | H01Q 1/243 343/866 |
| 2017/0133741 A1 * | 5/2017 | Kato | H01Q 1/2216 |

* cited by examiner

ANTENNA APPARATUS AND COMMUNICATION TERMINAL INSTRUMENT

BACKGROUND OF THE INVENTION

1. Field of the Invention

The present invention relates to antenna apparatuses and communication terminal instruments for use in RFID systems or near field wireless communication systems, which communicate with counterpart devices through electromagnetic signals.

2. Description of the Related Art

In an RFID system or a near field wireless communication system, the use of which is growing in recent years, a communication antenna is mounted on each device for communications between portable electronic instruments such as portable phones or between a portable electronic instrument and a reader/writer. Of these antennas, International Publication Pamphlet No. WO 2009/142114 discloses antennas to be mounted on portable electronic instruments.

FIG. 1A is a cross-sectional diagram of a principle portion of a wireless IC device described in International Publication Pamphlet No. WO 2009/142114. FIG. 1B is a diagram illustrating a spatial arrangement of a power feed circuit board and a radiation board of the wireless IC device. The wireless IC device 1 includes a wireless IC chip 5 that processes predetermined radio signals, a power feed circuit board 4 that is connected to the wireless IC chip 5 and includes a power feed circuit including at least one coil pattern 23, and a radiation plate 3 that radiates transmission signals provided from the power feed circuit board 4, receives reception signals, and provides them to the power feed circuit board 4. The radiation plate 3 includes in part an opening portion 7 and a slit portion 6 connecting to the opening portion 7. The opening portion 7 of the radiation plate 3 overlaps an inner side region of the coil pattern 23 in plan view when viewed in a winding axis direction of the coil pattern 23, and areas of the inner side region and the opening portion 7 are nearly equal to each other.

In FIG. 1A, when a radio signal is being transmitted, a signal current flows from the wireless IC chip 5 to the coil pattern 23. An induced magnetic field H generated by that current distributes through the opening portion 7 as illustrated by dotted lines in the drawing. The induced magnetic field H causes induced currents I1 and I2 to flow in a surrounding portion of the opening portion 7, as illustrated in FIG. 1B. Here, the slit portion 6 is connected to the opening portion 7. Thus, the slit portion 6 limits the flows of these induced currents I1 and I2. As described above, in the radiation plate 3, the induced currents I1 and I2 are induced by the magnetic field H. This magnetic field causes the radio signal to be transmitted.

However, it is necessary to have the opening portion and the slit portion in the radiation plate. Thus, a restriction is imposed on the shape of the radiation plate, and a highly accurate positional relationship between the radiation plate and the coil conductor must be satisfied.

SUMMARY OF THE INVENTION

Accordingly, preferred embodiments of the present invention provide an antenna apparatus and a communication terminal instrument in which a shape of a radiation plate may be more freely determined without requiring a highly accurate positional relationship between the radiation plate and a coil conductor.

An antenna apparatus according to a preferred embodiment of the present invention includes a power feed antenna that includes a coil conductor, to which a power feed circuit is connected; a first booster conductor that couples to the coil conductor of the power feed antenna through an electromagnetic field; and a second booster conductor that couples to the first booster conductor through an electromagnetic field and couples to the power feed antenna through an electromagnetic field.

For example, in plan view, a first edge portion of the coil conductor overlaps a first edge portion of the first booster conductor, a second edge portion of the coil conductor overlaps a first edge portion of the second booster conductor, and a second edge portion of the first booster conductor overlaps a second edge portion of the second booster conductor.

According to the foregoing structure, a current is induced in the first booster conductor by the power feed antenna, and a current is induced in the second booster conductor by the first booster conductor and the power feed antenna. Thus, according to the foregoing structure, neither an opening portion nor a slit is necessary. Thus, the provision of the first booster conductor and the second booster conductor makes it possible to more freely determine a shape of a radiation plate (first and second booster conductors).

When the first booster conductor is larger than the second booster conductor, a degree of freedom in arranging the two booster conductors becomes higher and fitting into an electronic device becomes easier, compared to a case where the first booster conductor and the second booster conductor have the same size.

Furthermore, when a distance between the power feed antenna and the first booster conductor is shorter than a distance between the power feed antenna and the second booster conductor, the first booster conductor, which is the larger booster conductor, couples to the power feed antenna more strongly. Accordingly, a better antenna characteristic may be obtained, compared to a case where the second booster conductor, which is the smaller booster conductor, couples to the power feed antenna more strongly.

A communication terminal instrument according to a preferred embodiment of the present invention includes an antenna apparatus including a power feed antenna that includes a coil conductor; a first booster conductor that couples to the coil conductor of the power feed antenna through an electromagnetic field; and a second booster conductor that couples to the first booster conductor through an electromagnetic field and couples to the power feed antenna through an electromagnetic field. The communication terminal instrument further includes a power feed circuit that is connected to the coil conductor.

The first booster conductor preferably is, for example, a metal member contained inside a casing or is the case of the communication terminal instrument. According to the foregoing structure, no special member is required to define the first booster conductor. Thus, the number of components, a device size, and manufacturing costs are significantly reduced.

According to various preferred embodiments of the present invention, no radiation plate having an opening portion and a slit is necessary. Thus, the provision of the first booster conductor and the second booster conductor makes it possible to determine the shape of the radiation plate (first and second booster conductors) more freely. Furthermore, a highly accurate positional relationship among the first and second booster conductors, which define the radiation plate, and the coil conductor is not required.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1A:
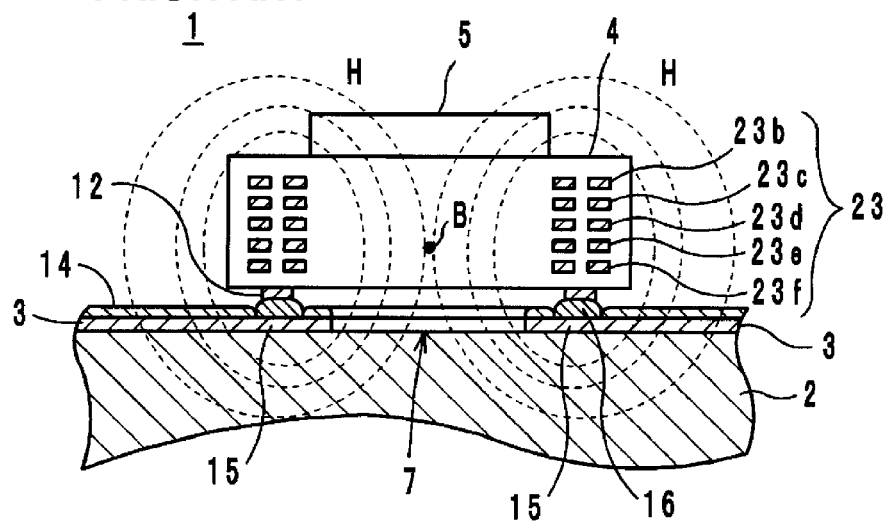
FIG. 1A is a cross-sectional diagram of a principle portion of a wireless IC device described in International Publication Pamphlet No. WO 2009/142114.
Figure 1B:
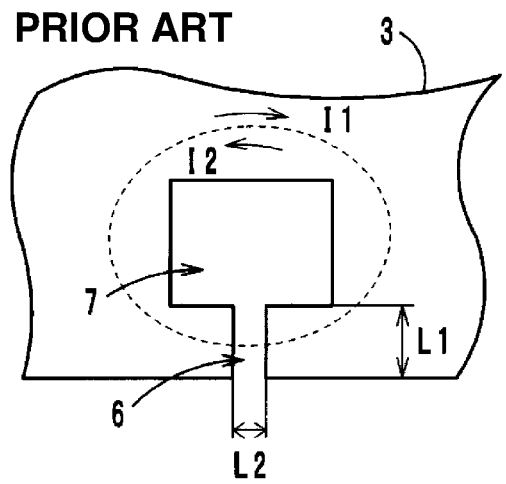
FIG. 1B is a diagram illustrating a spatial arrangement of a power feed circuit board and a radiation board of the wireless IC device.
Figure 2A:
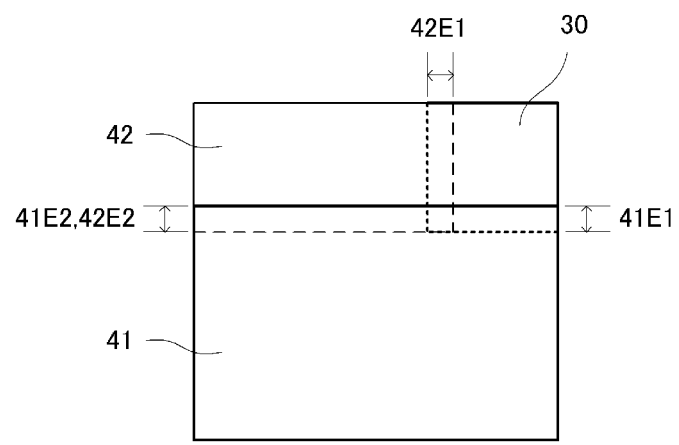
FIG. 2A is a schematic plan view of an antenna apparatus 101 according to a first preferred embodiment of the present invention.
Figure 2B:
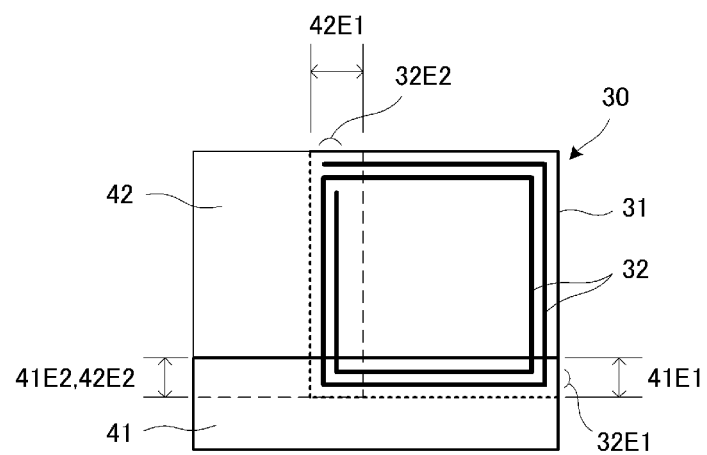
FIG. 2B is a partially enlarged plan view of the antenna apparatus 101.

An antenna apparatus according to a first preferred embodiment is described with reference to FIGS. 2A, 2B and FIGS. 3A-3D. FIG. 2A is a schematic plan view of an antenna apparatus 101 according to the first preferred embodiment, and FIG. 2B is a partially enlarged plan view of the antenna apparatus 101.

The antenna apparatus 101 includes a power feed antenna 30, a first booster conductor 41, and a second booster conductor 42. As illustrated in FIG. 2B, the power feed antenna 30 preferably includes a spiral coil conductor 32 located on an insulating support film 31 such as a polyimide film.

The first booster conductor 41 preferably includes a conducting film located on an insulating support film such as a polyimide film. Similarly, the second booster conductor 42 preferably includes a conducting film located on an insulating support film such as a polyimide film.

A first edge portion 32E1 of the coil conductor 32 overlaps a first edge portion 41E1 of the first booster conductor 41. This arrangement allows the first booster conductor 41 to couple to the coil conductor 32 of the power feed antenna 30 through an electromagnetic field. Furthermore, a second edge portion 32E2 of the coil conductor 32 overlaps a first edge portion 42E1 of the second booster conductor 42. This arrangement allows the second booster conductor 42 to couple to the coil conductor 32 of the power feed antenna 30 through an electromagnetic field. Still furthermore, a second edge portion 41E2 of the first booster conductor 41 overlaps a second edge portion 42E2 of the second booster conductor 42. This arrangement allows the first booster conductor 41 to couple to the second booster conductor 42 through an electromagnetic field.

Figure 3A:
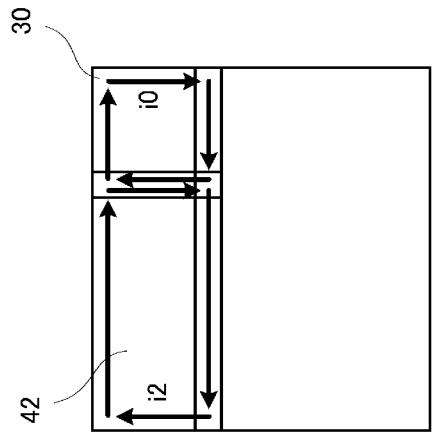
FIGS. 3A-3D are diagrams illustrating an operational principle of the antenna apparatus 101.

FIGS. 3A-3D are diagrams illustrating an operational principle of the antenna apparatus 101. FIG. 3A illustrates a way of coupling between the power feed antenna 30 and the first booster conductor 41.

As illustrated in FIG. 3A, a current i10 is induced in the first booster conductor 41 by a current i0 flowing through the coil conductor of the power feed antenna 30. That is, the current i0 causes the current i10 to flow through the first booster conductor 41 in a direction to cancel the current i0 at a portion where the power feed antenna 30 overlaps the first booster conductor 41. This current i10 circulates a circumference of the first booster conductor 41 due to an edge effect.

Figure 3B:
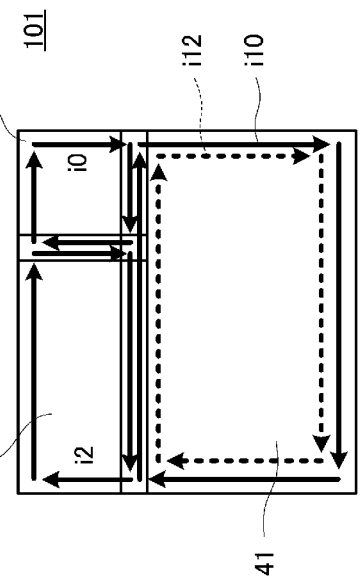

As illustrated in FIG. 3B, a current i2 is induced in the second booster conductor 42 by the current i0 flowing through the coil conductor of the power feed antenna 30. That is, the current i0 causes the current i2 to flow through the second booster conductor 42 in a direction to cancel the current i0 at a portion where the power feed antenna 30 overlaps the second booster conductor 42. This current i2 circulates a circumference of the second booster conductor 42 due to the edge effect.

Figure 3C:
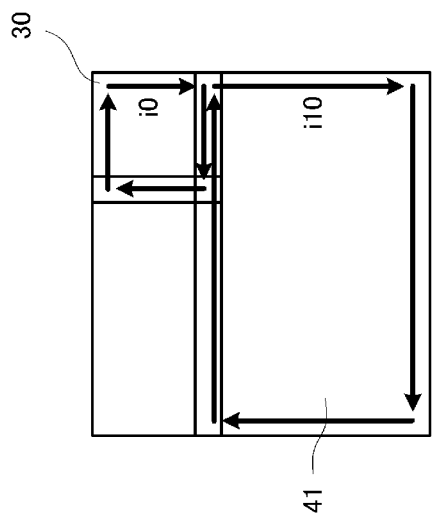

As illustrated in FIG. 3C, a current i12 is induced in the first booster conductor 41 by the current i2 flowing through the second booster conductor 42. That is, the current i2 causes the current i12 to flow through the first booster conductor 41 in a direction to cancel the current i2 at a portion where the second booster conductor 42 overlaps the first booster conductor 41. This current i12 circulates the circumference of the first booster conductor 41 due to the edge effect.

Figure 3D:
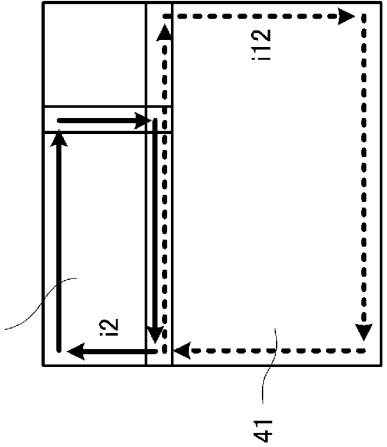

FIG. 3D illustrates the currents illustrated in FIGS. 3A-3C, which are superimposed on each other. Thus, the current i2 flows through the second booster conductor 42, and the currents i10 and i12 flow through the first booster conductor 41. The current i10 and the current i12 are currents in the same phase. Thus, both currents are added, and a current of i10+i12 flow through the first booster conductor 41. Accordingly, compared to a case where only the first booster conductor 41 is coupled to the power feed antenna 30, an additional current, the amount of which is equivalent to the current i2 and the current i12, flows. Furthermore, a current circulation path is expanded by having the current i2 flowing through the second booster conductor 42. These two effects improve an antenna gain.

It should be noted that there are a plurality of ways in the order of stacking the first booster conductor 41, the second booster conductor 42, and the power feed antenna 30. However, all the ways produce similar effects. When the first booster conductor 41 is larger than the second booster conductor 42, it is preferable, in view of improving an antenna characteristic, to have a shorter distance between the power feed antenna 30 and the first booster conductor 41 than a distance between the power feed antenna and the second booster conductor 42 because such an arrangement allows the first booster conductor 41, which is the larger booster conductor, to couple to the power feed antenna 30 more strongly.

In the example illustrated in FIG. 2, the coil conductor 32 defines a two-turn coil. The number of turns and the dimension of each side may be determined according to a required inductance. The coil conductor 32 and a circuit board are connected by, for example, pin terminals. That is, pad electrodes are preferably formed at both ends of the coil conductor 32 in advance, and configured so as to abut the pin terminals provided in a board on which the coil conductor 32 is mounted.

Second Preferred Embodiment

Figure 4:
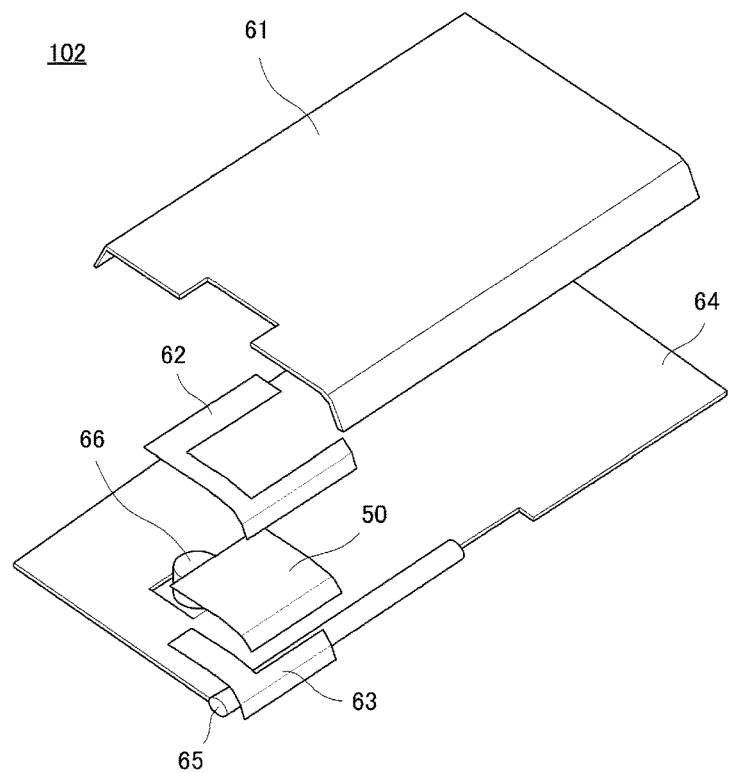
FIG. 4 is an exploded perspective view of an antenna apparatus 102 according to a second preferred embodiment of the present invention.
Figure 5:
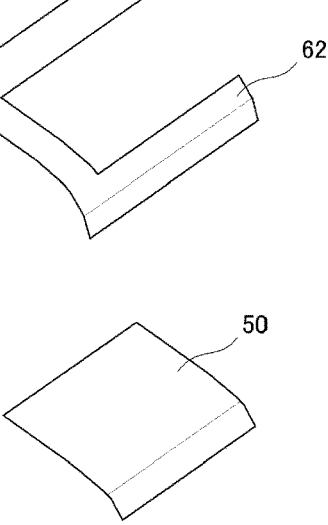
FIG. 5 is an exploded perspective view illustrating shapes of a second booster conductor 62, a power feed antenna 50, and a ferrite sheet 63, and a positional relationship among them.
Figure 5:
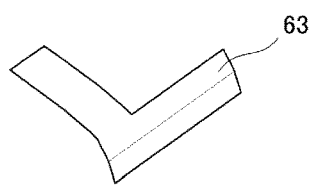
Figure 6:
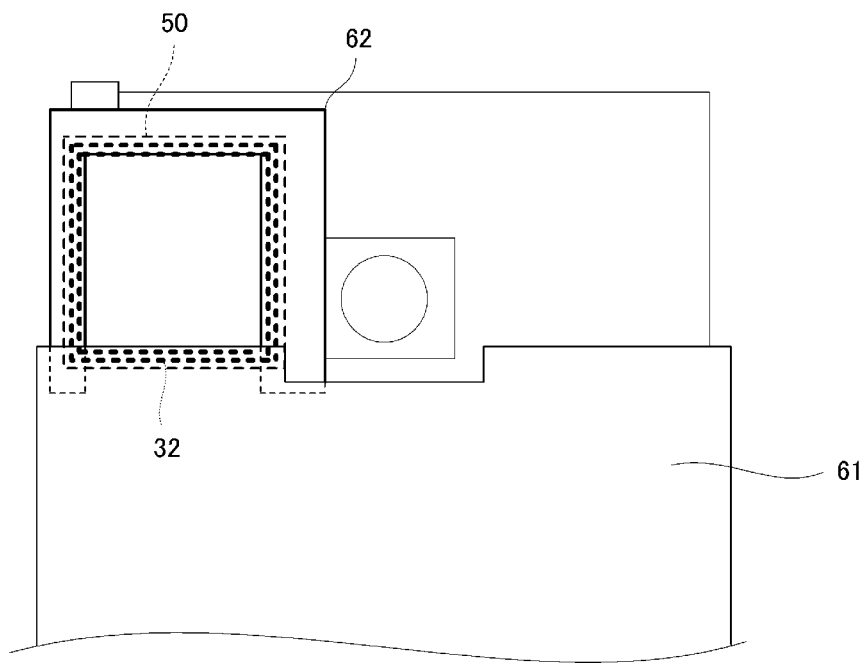
FIG. 6 is a partially enlarged plan view of the antenna apparatus 102.

An antenna apparatus and a communication terminal instrument according to a second preferred embodiment are described with reference to FIG. 4-FIG. 7. FIG. 4 is an exploded perspective view of an antenna apparatus 102 according to the second preferred embodiment. FIG. 5 is an exploded perspective view illustrating shapes of a second booster conductor 62, a power feed antenna 50 and a ferrite sheet 63, and a positional relationship among them. FIG. 6 is a partially enlarged plan view of the antenna apparatus 102. The antenna apparatus 102 is an antenna apparatus preferably for use typically in a near field wireless communication system or a RFID system using 13.56 MHz band (HF band), for example.

Figure 14:
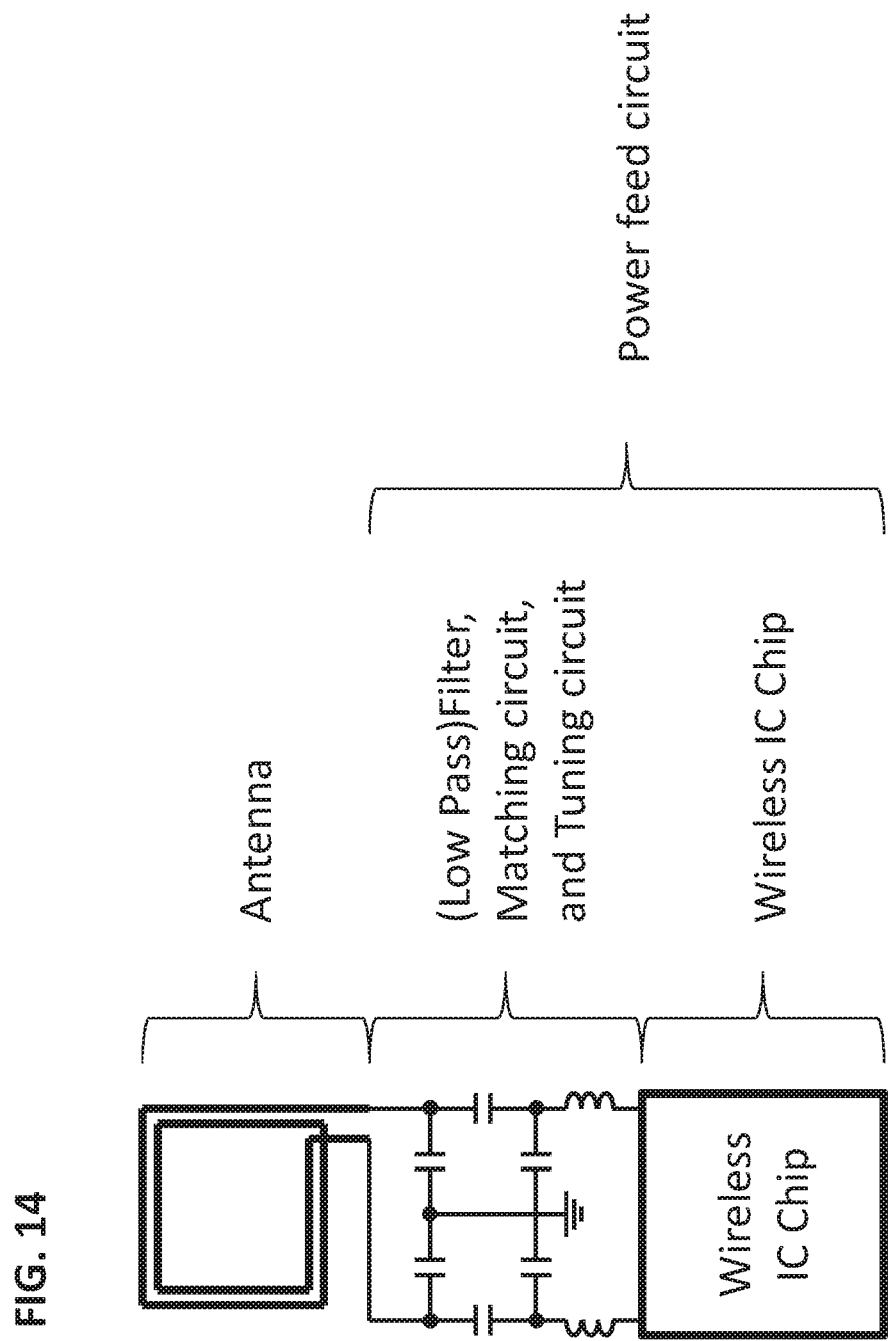
FIG. 14 is a schematic diagram illustrating a power feed circuit connected to a power feed antenna.

In FIG. 4, the antenna apparatus 102 preferably includes a power feed antenna 50, a first booster conductor 61, and a second booster conductor 62. Furthermore, the communication terminal instrument preferably includes the antenna apparatus 102, a printed wiring board 64, and components mounted on the printed wiring board 64. A rod antenna 65 and an image sensor 66 of a camera are mounted on the printed wiring board 64. Furthermore, a magnetic sheet 63, for example, such as a ferrite sheet, is arranged below the power feed antenna 50. Furthermore, the printed wiring board 64 is provided with a power feed circuit, for example, as shown in FIG. 14, that feeds power to a coil conductor 32 of the antenna apparatus 102. The first booster conductor 61 is a metal casing (thin metal sheet). That is, a member that is originally included in the communication terminal instrument is shared as the first booster conductor 61.

The power feed antenna 50 preferably includes a coil conductor located on an insulating support film, as is the case with the power feed antenna 30 illustrated in FIG. 2B in the first preferred embodiment. The second booster conductor 62 preferably has a shape similar to the letter "Π". The magnetic sheet 63 preferably has a shape similar to the letter "L", and overlaps the coil conductor 32 of the power feed antenna 50 on two sides thereof. The magnetic sheet 63 defines magnetic paths such that a magnetic flux, which extends beyond a winding center of the coil conductor of the power feed antenna 50, passes through edges of the printed wiring board.

In plan view, the first booster conductor 61 overlaps an edge portion of the coil conductor 32 of the power feed antenna 50, edge portions of the coil conductor 32 overlap edge portions of the second booster conductor 62, and an edge portion of the first booster conductor 61 overlaps edge portions of the second booster conductor 62. In this example, the second booster conductor 62 preferably has a shape similar to the letter "Π", and thus overlaps the coil conductor 32 on three sides. Furthermore, the first booster conductor 61 overlaps the coil conductor 32 on one side. That is, a loop is defined by the overlapping portion of the first booster conductor 61 and the overlapping portions of the second booster conductor 62, all of which overlap the coil conductor 32.

Figure 7:
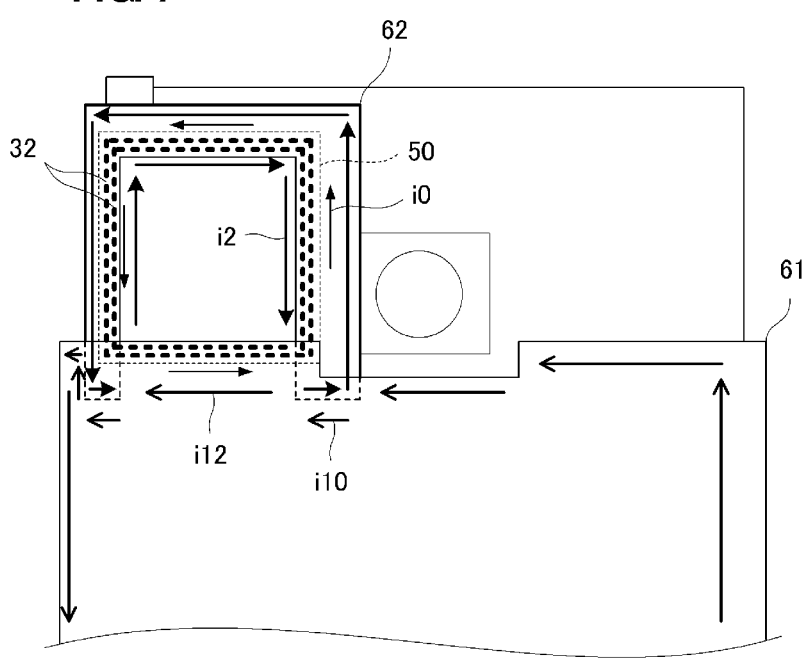
FIG. 7 is a diagram illustrating an operational principle of the antenna apparatus 102.

FIG. 7 is a diagram illustrating an operational principle of the antenna apparatus 102. FIG. 7 illustrates ways of coupling among the power feed antenna 50, the first booster conductor 61, and the second booster conductor 62.

First, a current i10 is induced in the first booster conductor 61 by a current i0 flowing through the coil conductor 32 of the power feed antenna 50. Furthermore, a current i2 is induced in the second booster conductor 62 by the current i0 flowing through the coil conductor 32 of the power feed antenna 50. Then, a current i12 is induced in the first booster conductor 61 by the current i2 flowing through the second booster conductor 62.

Accordingly, compared to a case where only the first booster conductor 61 is coupled to the power feed antenna 50, there exists an additional current flow, the amount of which is equivalent to the current i2 and the current i12. Furthermore, a current circulation path is expanded by having the current i2 flowing through the second booster conductor 62. These two effects improve an antenna gain.

It should be noted that the magnetic sheet 63 illustrated in FIG. 5 may have the same shape as that of the power feed antenna 50 to cover the whole area of a bottom plane of the power feed antenna 50, for example. Furthermore, when there is no need for forced shaping of the magnetic path, no magnetic sheet is necessary. Furthermore, a magnetic member other than the ferrite may be used as the magnetic sheet.

A capacitor for frequency adjustment may be connected to both ends of the coil conductor 32 that is included in the power feed antenna 50 to determine a resonance frequency of the antenna apparatus 102. This capacitor for frequency adjustment may be provided at any one of the power feed antenna 50, the printed wiring board 64, and a wireless IC component.

Third Preferred Embodiment

Figure 8A:
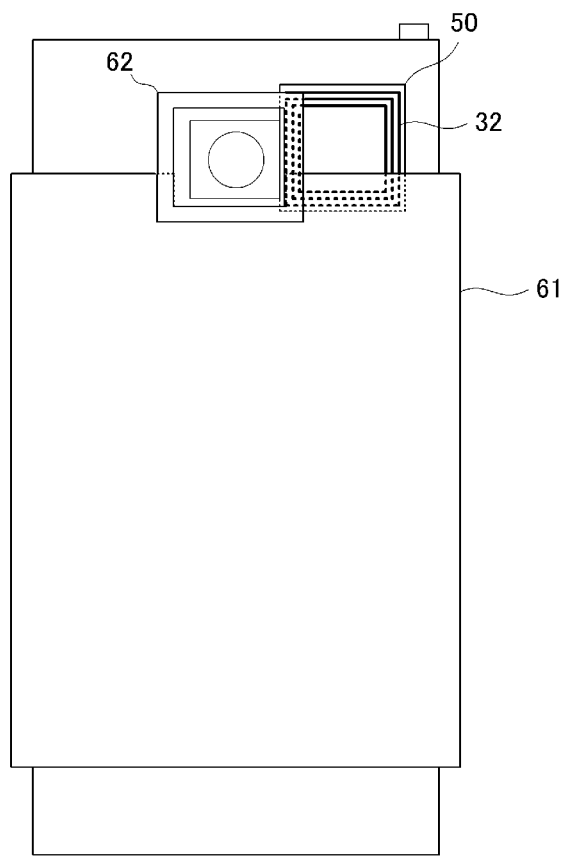
FIG. 8A is a plan view of an antenna apparatus 103.
Figure 8B:
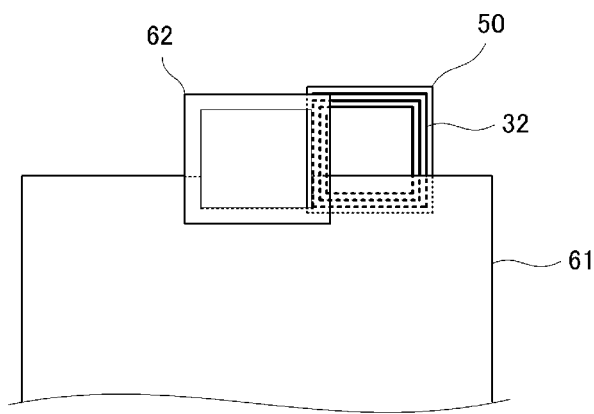
FIG. 8B is a plan view of a principle portion of the antenna apparatus 103.
Figure 9:
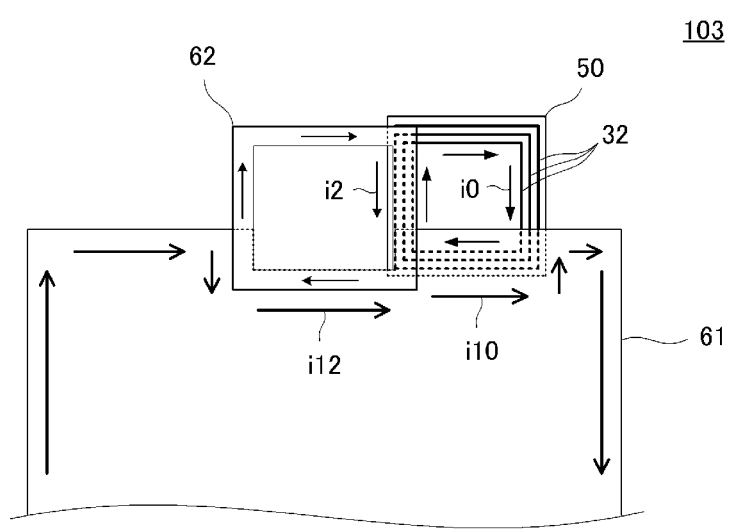
FIG. 9 is a diagram illustrating an operational principle of the antenna apparatus 103, and illustrates ways of coupling among a power feed antenna 50, a first booster conductor 61, and a second booster conductor 62.

An antenna apparatus according to a third preferred embodiment is described with reference to FIGS. 8A and 8B and FIG. 9. FIG. 8A is a plan view of an antenna apparatus 103, and FIG. 8B is a plan view of a principle portion of the antenna apparatus 103. FIG. 9 is a diagram illustrating an operational principle of the antenna apparatus 103, and illustrates ways of coupling among a power feed antenna 50, a first booster conductor 61, and a second booster conductor 62.

As illustrated in FIG. 8A, the antenna apparatus 103 preferably includes a coil conductor 32 of the power feed antenna, the first booster conductor 61, and the second booster conductor 62. The power feed antenna 50 preferably includes an insulating support film and the coil conductor 32 located on the support film. In the third preferred embodiment, the second booster conductor 62 preferably is ring-shaped, and one side thereof overlaps one side of the coil conductor 32. Furthermore, the power feed antenna 50, the first booster conductor 61, and the second booster conductor 62 are sequentially stacked in that order.

As illustrated in FIG. 9, first, a current i10 is induced in the first booster conductor 61 by a current i0 flowing through the coil conductor 32 of the power feed antenna 50. Furthermore, a current i2 is induced in the second booster conductor 62 by the current i0 flowing through the coil conductor 32 of the power feed antenna 50. Then, a current i12 is induced in the first booster conductor 61 by the current i2 flowing through the second booster conductor 62.

Accordingly, compared to a case where only the first booster conductor 61 is coupled to the power feed antenna 50, there exists an additional current flow, the amount of which is equivalent to the current i2 and the current i12. Furthermore, a current circulation path is expanded by having the current i2 flowing through the second booster conductor 62. These two effects improve an antenna gain.

Fourth Preferred Embodiment

Figure 10A:
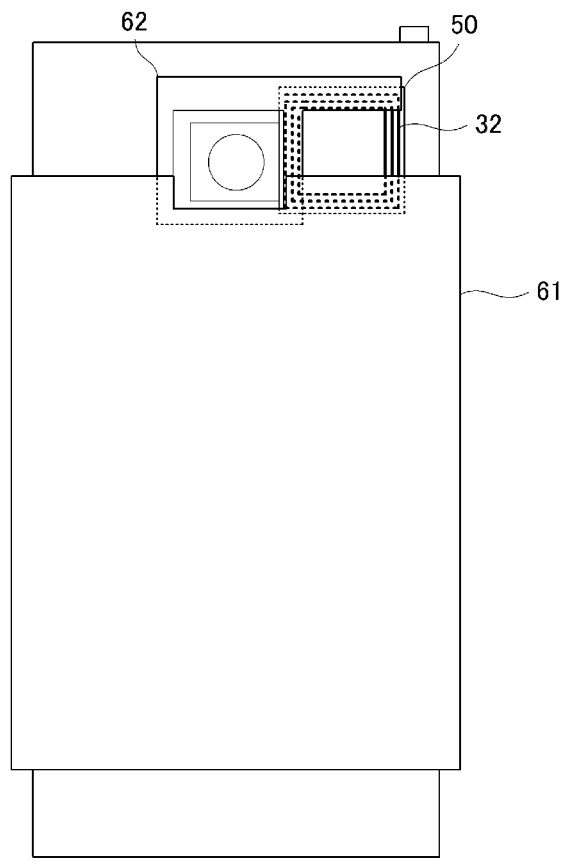
FIG. 10A is a plan view of an antenna apparatus 104.
Figure 10B:
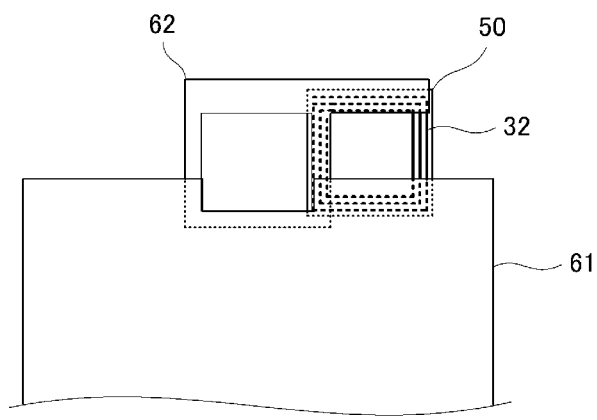
FIG. 10B is a plan view of a principle portion of the antenna apparatus 104.
Figure 11:
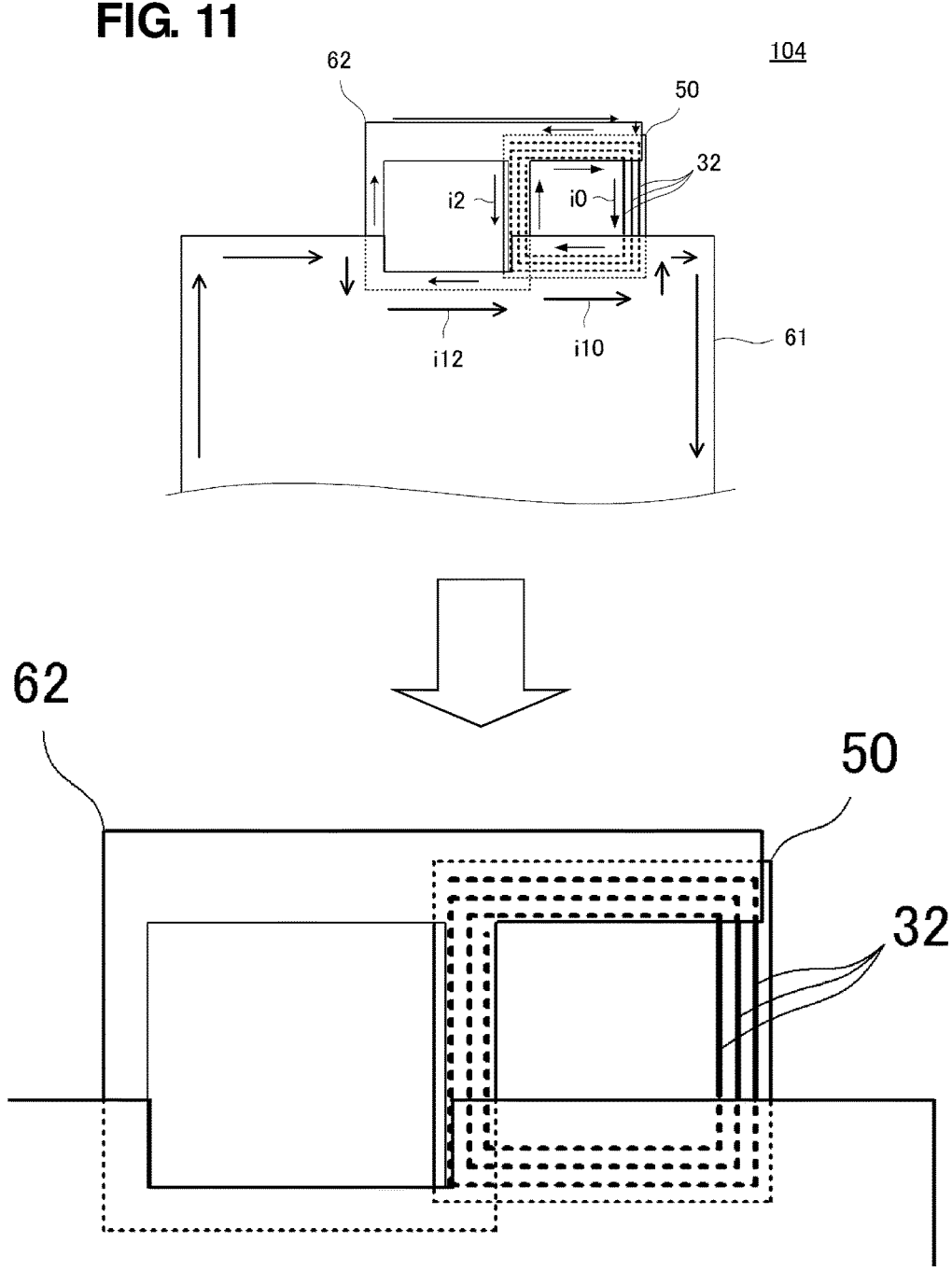
FIG. 11 is a diagram illustrating an operational principle of the antenna apparatus 104, and illustrates ways of coupling among a power feed antenna 50, a first booster conductor 61, and a second booster conductor 62.

An antenna apparatus according to a fourth preferred embodiment is described with reference to FIGS. 10A, 10B and FIG. 11. FIG. 10A is a plan view of an antenna apparatus 104, and FIG. 10B is a plan view of a principle portion of the antenna apparatus 104. FIG. 11 is a diagram illustrating an operational principle of the antenna apparatus 104, and illustrates ways of coupling among a power feed antenna 50, a first booster conductor 61, and a second booster conductor 62.

As illustrated in FIG. 10A, the antenna apparatus 104 preferably includes a coil conductor 32 of the power feed antenna, the first booster conductor 61, and the second booster conductor 62. The power feed antenna 50 preferably includes an insulating support film and the coil conductor 32 located on the support film. In the fourth preferred embodiment, the second booster conductor 62 has a ring portion and a portion linearly extending therefrom, and overlaps the coil conductor 32 on two sides thereof. Furthermore, the power feed antenna 50, the second booster conductor 62, and the first booster conductor 61 are sequentially stacked in that order.

As illustrated in FIG. 11, a current i10 is induced in the first booster conductor 61 by a current i0 flowing through the coil conductor 32 of the power feed antenna 50. Furthermore, a current i2 is induced in the second booster conductor 62 by the current i0 flowing through the coil conductor 32 of the power feed antenna 50. Then, a current i12 is induced in the first booster conductor 61 by the current i2 flowing through the second booster conductor 62.

Accordingly, compared to a case where only the first booster conductor 61 is coupled to the power feed antenna 50, there exists an additional current flow, the amount of which is equivalent to the current i2 and the current i12. Furthermore, a current circulation path is expanded by having the current i2 flowing through the second booster conductor 62. These two effects improve an antenna gain.

Fifth Preferred Embodiment

Figure 12A:
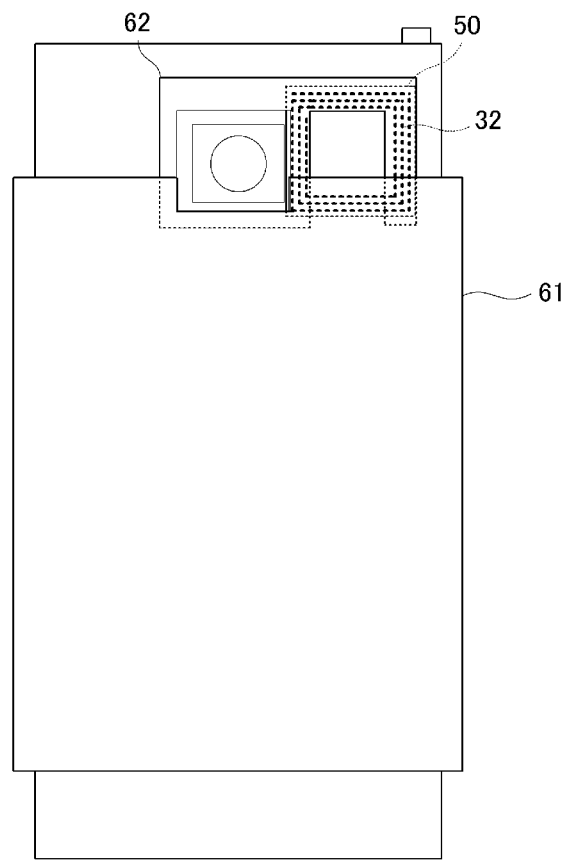
FIG. 12A is a plan view of an antenna apparatus 105.
Figure 12B:
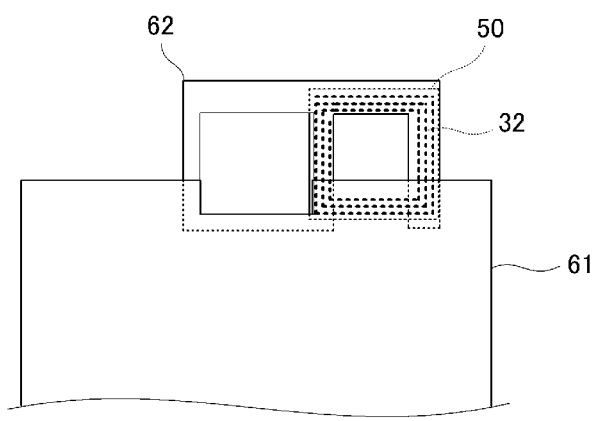
FIG. 12B is a plan view of a principle portion of the antenna apparatus 105.
Figure 13:
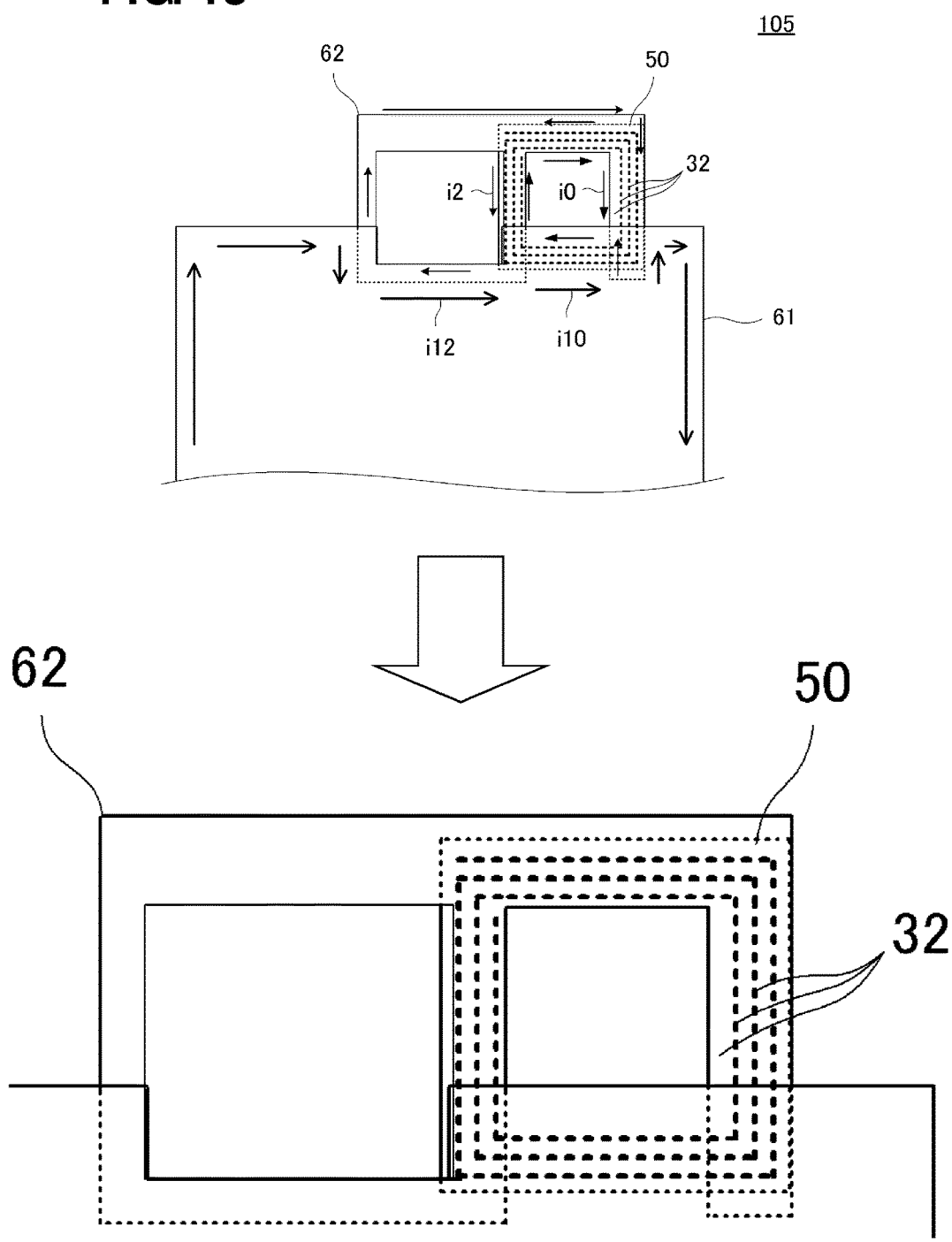
FIG. 13 is a diagram illustrating an operational principle of the antenna apparatus 105, and illustrates ways of coupling among a power feed antenna 50, a first booster conductor 61, and a second booster conductor 62.

An antenna apparatus according to a fifth preferred embodiment is described with reference to FIGS. 12A and 12B and FIG. 13. FIG. 12A is a plan view of an antenna apparatus 105, and FIG. 12B is a plan view of a principle portion of the antenna apparatus 105. FIG. 13 is a diagram illustrating an operational principle of the antenna apparatus 105, and illustrates ways of coupling among a power feed antenna 50, a first booster conductor 61, and a second booster conductor 62.

As illustrated in FIG. 12A, the antenna apparatus 105 preferably includes a coil conductor 32 of the power feed antenna, the first booster conductor 61, and the second booster conductor 62. The power feed antenna 50 preferably includes an insulating support film and the coil conductor 32 located on the support film, and includes an opening in a center portion. In the fifth preferred embodiment, the second booster conductor 62 includes a ring portion and a portion that has a shape similar to the letter and extends from the ring portion, and overlaps the coil conductor 32 on three sides thereof. Furthermore, the power feed antenna 50, the second booster conductor 62, and the first booster conductor 61 are sequentially stacked in that order.

As illustrated in FIG. 13, first, a current i10 is induced in the first booster conductor 61 by a current i0 flowing through the coil conductor 32 of the power feed antenna 50. Furthermore, a current i2 is induced in the second conductor 62 by the current i0 flowing through the coil conductor 32 of the power feed antenna 50. Then, a current i12 is induced in the first booster conductor 61 by the current i2 flowing through the second booster conductor 62.

Accordingly, compared to a case where only the first booster conductor 61 is coupled to the power feed antenna 50, there exists an additional current flow, the amount of which is equivalent to the current i2 and the current i12. Furthermore, a current circulation path is expanded by having the current i2 flowing through the second booster conductor 62. These two effects improve an antenna gain.

Other Preferred Embodiments

In the foregoing preferred embodiments, the power feed coils include spiral conductor patterns. Alternatively, the power feed coils may include multilayered loop (helical) conductor patterns. The number of turns may be one if needed. Furthermore, planar shapes of the conductor patterns do not need to be rectangular, and may be circular or an irregular shape. Still furthermore, the number of the booster conductors may be three or more.

In the foregoing preferred embodiments, the examples are described for a case in which the power feed coil are preferably coupled to the first booster conductor and the second booster conductor through mostly a magnetic field. However, the coupling may be made through mostly an electric field depending on the frequency band. Furthermore, the coupling may alternatively be made through both an electric field and a magnetic field. This is because, when a high frequency signal is used, sufficient energy may be transferred even by capacitance generated between the power feed coil and the booster conductor. In the scope of claims and description of the present application, the "coupling through an electromagnetic field" includes three modes of coupling: "(1) coupling through mostly an electric field; (2) coupling through mostly a magnetic field; and (3) coupling through an electric field and a magnetic field".

Furthermore, in the foregoing preferred embodiments, the examples are described for a case in which the present invention is applied to HF-band RFID devices. However, the present invention is not limited to the HF-band RFID devices, and may be similarly applied to UHF-band RFID devices. In cases with the UHF-band, the currents flow along not only circumferences of the first booster conductor and the second booster conductor, but also a plurality of current path loops distributed over the booster conductors and electromagnetic fields are induced in such a way that a magnetic flux interlinks adjacent current loops. Furthermore, preferred embodiments of the present invention may also be applicable to systems other than an RFID system.

The power feed circuit, which is connected to the coil conductor of the antenna apparatus according to a preferred embodiment of the present invention, preferably includes, for example, a wireless IC component. The wireless IC component is typically mounted on the printed wiring board, but may alternatively be mounted on the power feed antenna.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna apparatus comprising:
a power feed antenna including a coil conductor and connected to a power feed circuit;
a first planar conductor that at least partially overlaps the coil conductor of the power feed antenna; and
a second planar conductor that at least partially overlaps the coil conductor of the power feed antenna; wherein
the first planar conductor has a planar plate shape;
the second planar conductor has a planar plate shape; and
a winding axis of the coil conductor extends in a direction that is perpendicular or substantially perpendicular to surfaces of the first and second planar conductors.

2. The antenna apparatus according to claim 1, wherein the first planar conductor is larger than the second planar conductor.

3. The antenna apparatus according to claim 1, wherein a distance between the power feed antenna and the first planar conductor is less than a distance between the power feed antenna and the second planar conductor.

4. The antenna apparatus according to claim 1, wherein the coil conductor is a rectangular or substantially rectangular spiral conductor located on an insulating support film.

5. The antenna apparatus according to claim 1, wherein the coil conductor includes multilayered loop conductor patterns.

6. The antenna apparatus according to claim 1, wherein each of the first planar conductor and the second planar conductor includes a conducting film located on an insulating support film.

7. The antenna apparatus according to claim 1, wherein the second planar conductor is ring-shaped and overlaps one side of the coil conductor.

8. The antenna apparatus according to claim 1, wherein the second planar conductor includes a ring portion and a linearly extending portion extending from the ring portion, and the second planar conductor overlaps the coil conductor on two sides thereof.

9. The antenna apparatus according to claim 1, wherein the second planar conductor includes a ring portion and an L-shaped or substantially L-shaped portion extending from the ring portion, and the second planar conductor overlaps the coil conductor on three sides thereof.

10. The antenna apparatus according to claim 1, wherein a portion of the power feed antenna does not overlap either of the first planar conductor and the second planar conductor.

* * * * *